3,366,514
METAL SURFACE TREATMENT
Rajendra Nath Chadha, Tecumseh, and Townsend H. Porter, Adrian, Mich., assignors to Stauffer Chemical Company
No Drawing. Filed Nov. 9, 1964, Ser. No. 409,927
17 Claims. (Cl. 148—6.2)

This invention relates to a method of treating metal surfaces. More particularly, this invention relates to a method of treating metal surfaces to accept silicone rubber.

The use of silicone rubber as a metal coating has proved especially valuable where the coating is in contact with hot oil. In order to utilize most silicone rubber stocks for coating purposes, it is necessary to prime the surface to be coated to make possible a tenacious void-free bond. A great deal of effort has been expended in the development of satisfactory primers. Originally, these primers were chlorosilanes, which were applied to metal surfaces and hydrolyzed, leaving an essentially monomolecular layer of siloxane to which silicone rubber would adhere. It was commercially desirable, however, to find liquid primers which were relatively innocuous to handle and which merely require application and drying. As silicone technology advanced, silicates such as ethylorthosilicate and ethylpolysilicate were tried, but these were found to give unsatisfactory results in the systems tried. Consequently, essentially all the silicone primers presently employed are based on fluid organo-substituted siloxanes.

While all the present commercial silicone primers have proved to be very good, they have not been completely dependable. When these primers have been employed in conjunction with silicone rubber as a metal surface coating and the coated metal has been immersed in certain hot hydrocarbon oils, there have been occasional failures in the rubber-to-metal bond. These failures have been caused, apparently, by the presence in the oils of components either naturally present or included as additives. These components appear to contain sulfur in an oxidized state, e.g. as a sulfate, sulfite or sulfonate. A typical example of such components has been a sulfonated sperm oil present in amounts from about 0.5 to about 5% by weight based on the weight of the oil composition.

One of the objects of this invention is to provide a method for protecting metal surfaces. Another object is to provide a method for preparing metal surfaces so that silicone rubber can be bonded to these surfaces and the bond will withstand the effect of hot oils containing sulfur in an oxidized state. Another object of this invention is to make possible the use of less sophisticated primers than those presently in use. Another object is to provide a system which will accomplish these ends in a simple commercially-acceptable manner. These objects, as well as others which are apparent from the following description, are satisfied by this invention.

This invention is a method of treating a solid surface, especially the surface of a metal susceptible to sulfide formation, which comprises applying thereto an acidic solvent solution consisting of (a) a soluble hexavalent chromium compound, (b) an organic acid, and (c) an alkylpolysilicate, said solvent having a boiling point less than about 90° C., and allowing the surface to dry.

The hexavalent chromium compound (a) is generally an alkali metal dichromate such as sodium dichromate or potassium dichromate, but any soluble salt, i.e. dichromate or chromate, can be employed. The concentration of the chromium can vary from 0.1% to 1.0% by weight, but preferably is less than 0.5% by weight, based on total solution.

The acid (b) which is utilized in combination with the hexavalent-chromium compound is preferably acetic, but can be any monocarboxylic acid of 1 to 10 carbon atoms, such as propionic, n-butyric or n-valeric acid. The acid maintains a pH of from about 3 to 6. The acid concentration can very from 2 to 10% by weight but preferably is from 4 to 6% by weight based on total solution.

The most common alkylpolysilicate (c) useful in the present invention is ethylpolysilicate. Commercial fluid ethylpolysilicate contains up to about 40% by weight (about 29.3 mol percent) $SiO_2$, i.e. $SiO_{4/2}$ units, and has inconsistent adhesion and no hot oil resistance when used as a primer. It has been found that by using refined techniques, ethylpolysilicate can be prepared containing up to as high as 54% by weight (about 42 mol percent) or even 60% $SiO_2$ units by weight. Such ethylpolysilicates when used alone provide excellent adhesion as primers for silicone rubber on solid surfaces, especially on metal surfaces, but they have no hot oil resistance.

The degree of condensation of the alkyl polysilicates, exemplified by ethylpolysilicate, as indicated by the percentage of $SiO_2$ units is critical for their use as primers. The alkyl groups can be any alkyl groups containing up to about 12 carbon atoms, such as methyl, ethyl, propyl, butyl, hexyl, 2-ethylhexyl, decyl and dodecyl groups. However, the preferred polysilicates are methylpolysilicate, ethylpolysilicate and propylpolysilicate, each containing at least about 32 mol percent $SiO_2$ units and preferably at least about 33 mol percent $SiO_2$ units. The most commercially attractive polysilicate from considerations of cost and handling ease (including toxicity) is ethylpolysilicate.

The alkylpolysilicates employed herein can be prepared by such methods as those illustrated in U.S. Patent 2,799,693.

The polysilicates can be diluted with any suitable solvent to as low as about 1.0% by weight polysilicate measured as ethylpolysilicate. Preferably, the polysilicate concentration in solvent is at least 2.0% by weight, based on total solution. As a practical matter, no more than about 5.0% by weight of polysilicate, measured as ethylpolysilicate, in solvent need be used for priming although a 10% or more by weight solution can be used.

The solvents which can be employed in this invention can include any organic liquids having a boiling point less than about 90° C. These are principally ketones such as acetone, 2-butanone or methyl isobutyl ketone. Organic liquids which boil at low temperatures such as 30° C. or lower can be used if the solution is kept cold or if they are present as part of a mixed solvent. Similarly, higher boiling liquids can be included in solvent mixtures in amounts sufficiently small so that the resulting solvents have boiling points less than about 90° C.

Metal surfaces are presently washed with water after any other treatment such as pickling. The water-wet surfaces are subsequently washed with acetone to remove the water and make possible quick drying of the metal surface at essentially room temperature due to the volatility of the acetone. This invention can be used commercially by treating the dry metal surface with the hexavalent-chromium-compound solution of this invention.

While the simplest means for applying the composition of this invention to a surface is by immersion of the surface in the composition, the composition can also be applied by other fluid handling techniques such as spraying, brushing or flooding.

The metal surfaces which can be protected by this invention are those susceptible to sulfide formation and include, for example, steel, iron, brass, tin, silver, lead and copper. The surface treatment of this invention prevents or inhibits rusting in any of its common forms such as, for example, oxidation, sulfide formation or chloride formation.

As an additional benefit of this invention, it has been found that metal surfaces which have been treated in accordance with this invention can be coated by standard techniques, with silicone rubber, especially high durometer stock and the resulting bonds are far superior in resistance to the above-described hot oils than previously attainable bonds.

Silicone rubber is deposited on the treated surface in any desired manner. For example, vulcanized sheets of the rubber can be applied to the surface and bonded under light pressure at temperatures up to 200° C. Alternatively, unvulcanized silicon rubber stock can be extruded, calendered, doctored or otherwise applied to the primed surface and vulcanized in the normal manner for the stock employed. The silicone rubbers employed herein are well-known; they are based on siloxane polymers containing fillers, vulcanizing agents, pigments and other known materials.

The method of this invention is useful in the preparation of surfaces on which heat-curable peroxide-containing organopolysiloxane rubbers or room-temperature-vulcanizing organopolysiloxane rubbers are to be bonded and subsequently exposed to hot oils such as in oil and bearing seals and in roll coverings.

A typical procedure using all facets of this invention consists of taking a chlorinated-solvent-cleaned, pickled and water-washed metal surface, dipping it into an acidic alkylpolysilicate hexavalent-chromium-solvent solution, letting the treated surface dry, applying to the primed surface a silicone rubber stock and curing the rubber by standard techniques. The resulting rubber-metal bond is strong, uniform and resistant to hot oils, even hot oils with components containing sulfur in an oxidized state, e.g. sulfonated sperm oil.

The following examples are intended not to limit but to illustrate this invention, which is properly delineated in the claims. All measurements and proportions are by weight unless otherwise noted.

*Example I*

Steel panels which have been cleaned with a chlorinated solvent, pickled and rinsed with water are dipped into a solution prepared by combining 0.30 gm. of sodium dichromate in 5.0 gms. of acetic acid with 3.0 gms. of ethylpolysilicate of 45 weight percent $SiO_2$ content and 91.7 gms. of acetone and allowing the panels to air-dry. The resulting panels are rust resistant.

Strips of an uncured standard commercial silicone rubber stock based on a dimethylsiloxane-methylvinylsiloxane gum copolymer and containing silica filler and a peroxide vulcanizing agent are applied to steel panels treated as described above. These specimens are vulcanized at 330° C. at 1000 p.s.i.g. for 10 minutes and are then immersed in a commercial paraffinic oil containing between 0.5 and 5% sulfonated sperm oil. After 158 hours at 300° F. all the rubber to steel bonds are complete and strong.

*Example II*

When the following alkylpolysilicates are substituted for the ethylpolysilicate in the procedure of Example I, similar results are obtained.

Ethylpolysilicate containing 50% $SiO_2$ units
Methylpolysilicate containing 57% $SiO_2$ units
Propylpolysilicate containing 38% $SiO_2$ units

*Example III*

When each of the following solutions are substituted for the solution in Example I employing ethylpolysilicate containing 45% $SiO_2$ and the resulting treated steel panels are further treated and rubber coated, similar results are obtained:

0.4% $Na_2Cr_2O_7$, 3% acetic acid, 4% EPS and 90.6% acetone
0.5% $K_2Cr_2O_7$, 4% acetic acid, 7% EPS and 88.5% acetone
1% $Na_2Cr_2O_7$, 6% propionic acid, 4% EPS and 89.0% methylisobutyl ketone
2.5% $Na_2Cr_2O_7$, 8% n-valeric acid, 3% EPS and 86.5% acetone
1% $Na_2Cr_2O_7$, 5% acetic acid, 2% EPS and 92.0% acetone

*Example IV*

When each of the following panels are treated sequentially in accordance with the procedures of Example I, similar results are obtained.

| | |
|---|---|
| Copper | Aluminum |
| Tin-coated steel | Glass |

Having thus described our invention, we claim:

1. A composition consisting essentially of a solution of (a) from about 0.1 to about 1.0 weight percent based on the total weight of the solution of chromium added as a hexavalent chromium compound, (b) from about 2.0 to 10.0 weight percent based on the total weight of solution of a monocarboxylic acid containing from 1 to 10 carbon atoms and (c) from 1.0 to 10.0 weight percent based on the total weight of the solution of an alkylpolysilicate in which each of the alkyl groups contains up to 12 carbon atoms, said alkylpolysilicate containing at least 32 mol percent $SiO_2$ units, said alkylpolysilicate percentage measured as ethylpolysilicate, the remainder being essentially a solvent having a boiling point less than 90° C.

2. The composition of claim 1 wherein the hexavalent chromium compound is an alkali metal dichromate and each of the alkyl groups in the alkylpolysilicate contains from 1 to 3 carbon atoms.

3. The composition of claim 2 wherein the chromium (a) is present in an amount no greater than about 0.5 percent by weight, the acid (b) is present in an amount of from 4 to 6 percent by weight and the alkylpolysilicate is present in an amount from 2 to 5 percent by weight measured as ethylpolysilicate based on the weight of the solution.

4. The composition of claim 3 wherein the solvent is a ketone.

5. The composition of claim 4 wherein the alkylpolysilicate (c) is ethylpolysilicate.

6. The method of treating a solid surface comprising (1) applying thereto a solution of (a) from about 0.1 to about 1.0 weight percent based on the total weight of the solution of chromium added as a hexavalent chromium compound, (b) from about 2.0 to 10.0 weight percent based on the total weight of solution of a monocarboxylic acid containing from 1 to 10 carbon atoms and (c) from 1.0 to 10.0 weight percent based on the total weight of the solution of an alkylpolysilicate in which each of the alkyl groups contains up to 12 carbon atoms, said alkylpolysilicate containing at least 32 mol percent $SiO_2$ units, said alkylpolysilicate percentage measured as ethylpolysilicate, the remainder being essentially a solvent having a boiling point less than 90° C., and (2) allowing the surface to dry.

7. The method of claim 6 wherein the solid surface is composed of a metal susceptible to sulfide formation.

8. The method of claim 7 wherein the hexavalent chromium compound is an alkali metal dichromate and each of the alkyl groups in the alkylpolysilicate contains from 1 to 3 carbon atoms.

9. The method of claim 8 wherein chromium (a) is present in an amount no greater than about 0.5 percent by weight, the acid (b) is present in an amount of from 4 to 6 percent by weight and the alkylpolysilicate is present in an amount from 2 to 5 percent by weight measured as ethylpolysilicate based on the weight of the solution.

10. The method of claim 9 wherein the solvent is a ketone.

11. The method of claim 10 wherein the alkylpolysilicate is ethylpolysilicate.

12. The method comprising (1) applying to a solid surface a solution of (a) from about 0.1 to about 1.0 weight percent based on the total weight of the solution of chromium added as a hexavalent chromium compound, (b) from about 2.0 to 10.0 weight percent based on the total weight of solution of a monocarboxylic acid containing from 1 to 10 carbon atoms and (c) from 1.0 to 10.0 weight percent based on the total weight of the solution of an alkylpolysilicate in which each of the alkyl groups contains up to 12 carbon atoms, said alkylpolysilicate containing at least 32 mol percent $SiO_2$ units, said akylpolysilicate percentage measured as ethylpolysilicate, the remainder being essentially a solvent having a boiling point less than 90° C., (2) allowing the surface to dry, (3) applying to the dry primed surface a curable silicone rubber and (4) curing said silicone rubber.

13. The method of claim 12 wherein the solid surface is composed of a metal susceptible to sulfide formation.

14. The method of claim 13 wherein the hexavalent chromium compound is an alkali metal dichromate and each of the alkyl groups in the alkylpolysilicate contains from 1 to 3 carbon atoms.

15. The method of claim 14 wherein chromium (a) is present in an amount no greater than about 0.5 percent by weight, the acid (b) is present in an amount of from 4 to 6 percent by weight and the alkylpolysilicate is present in an amount from 2 to 5 percent by weight measured as ethylpolysilicate based on the weight of the solution.

16. The method of claim 15 wherein the solvent is a ketone.

17. The method of claim 16 wherein the alkyl polysilicate is ethylpolysilicate.

No references cited.

RALPH S. KENDALL, *Primary Examiner.*